G. W. PETERS AND O. F. ALKIRE.
ELECTRODE.
APPLICATION FILED FEB. 27, 1920.
1,356,468.
Patented Oct. 19, 1920.
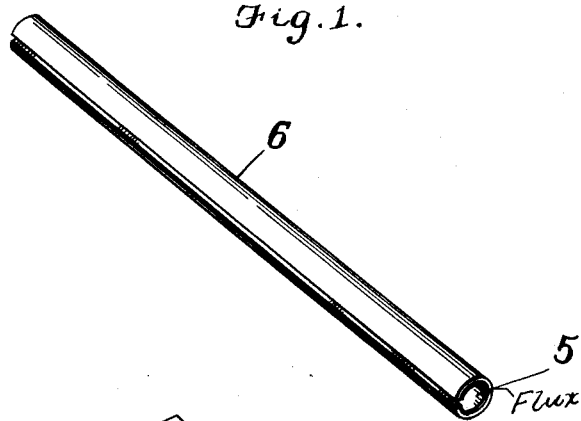
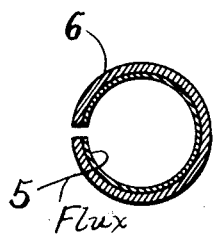
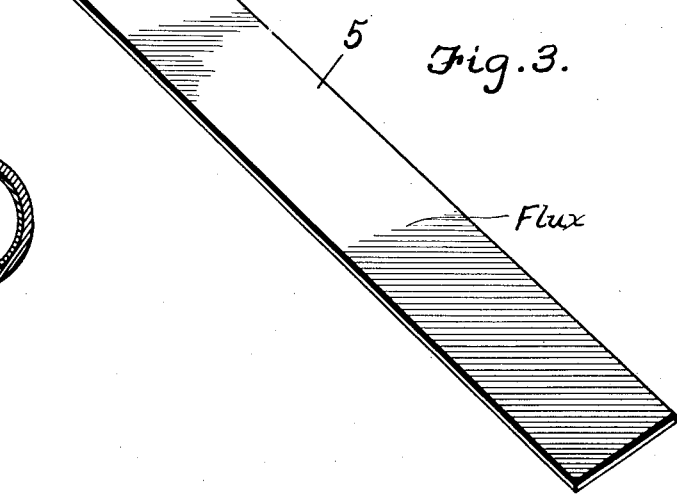
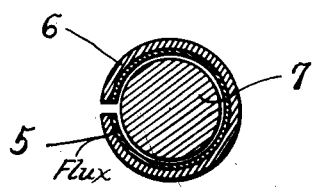
George W. Peters
Oscar F. Alkire
INVENTORS

UNITED STATES PATENT OFFICE.

GEORGE W. PETERS AND OSCAR F. ALKIRE, OF CHARLESTON, WASHINGTON.

ELECTRODE.

1,356,468.  Specification of Letters Patent.  Patented Oct. 19, 1920.

Application filed February 27, 1920. Serial No. 361,676.

*To all whom it may concern:*

Be it known that we, GEORGE W. PETERS and OSCAR F. ALKIRE, citizens of the United States, residing at Charleston, in the county of Kitsap and State of Washington, have invented new and useful Improvements in Electrodes, of which the following is a specification.

This invention relates to an electrode employed in electric arc welding.

The primary object of the invention is the production of an electrode of welding material having therein a flux to assist fusion, and whereby a weld may be made in an easy, quick and efficient manner.

A further object is to construct an electrode of welding material from a cold rolled flat strip which has one of its faces coated with a flux and which is rolled to tubiform with the confronting edges thereof slightly spaced so that the heat will be applied to the interior as well as to the exterior of the electrode, and consequently permit of a quick fusion thereof.

A still further object is the production of an open seam electrode constructed of a cold rolled strip of welding metal coated on its inner face with a flux, having its confronting ends disconnected and which receives therein a welding wire which is fed through the tube at desired speed to the fusing end of the electrode.

The drawings illustrate the improvement.

In the drawings:—

Figure 1 is a perspective view of the electrode.

Fig. 2 is a transverse section therethrough.

Fig. 3 is a view of the strip before the same is rolled to illustrate the easy manner in which the flux may be connected thereon.

Fig. 4 is a view showing the manner in which a welding wire may be fed through the electrode.

As disclosed by the drawings the electrode comprises a flat strip of welding material. The strip is cold rolled to avoid scale and other undesirable elements on the surface thereof which would otherwise have a tendency to interfere with the contact between the electrode and the electrode holder. When in flat condition the strip has applied to one face thereof a coating of flux, indicated by the numeral 5. The strip is now arranged on forming rolls which brings the same to tubi-form. The tube is indicated by the numeral 6, and the confronting edges thereof are not connected, but are preferably slightly spaced away from each other. This is an important feature of the invention, because the flux 5 is arranged on the interior of the strip tube 6, and the heat is permitted to contact with both the inner and outer surfaces of the tube. The flux flowing with the metal causes the proper adhesion of the parts to be welded. The tube may be easily handled and properly directed to a joint to be welded.

In practice we have, in many instances, found it desirable to employ in connection with the split tubular electrode a welding wire 7 which is of a size to be passed freely through the bore of the tube and which will materially assist in obtaining a quick weld.

The construction and advantages of our electrode will present themselves to those skilled in the art to which such inventions appertain without further detail description.

Having thus described the invention, what we claim is:—

1. A welding electrode comprising a tube of welding material having an inner coating of flux.

2. A welding electrode, comprising a split tube of welding material, and an inner coating of flux on the tube.

3. A welding electrode, comprising a split tube of welding material, the confronting edges of which being spaced from each other, and an inner coating of flux in the said tube.

4. A welding electrode, comprising a split tube of welding material having an inner coating of flux, and a welding wire movable longitudinally through the tube.

5. The method of constructing welding electrodes, comprising a cold rolled strip of welding metal, a coating of flux on one of the faces thereof, rolling the said strip to tubi-form to bring the confronting edges thereof adjacent each other but free from connection.

In testimony whereof we affix our signatures.

GEORGE W. PETERS.
OSCAR F. ALKIRE.